US006617388B2

(12) United States Patent
Chen et al.

(10) Patent No.: US 6,617,388 B2
(45) Date of Patent: Sep. 9, 2003

(54) CURING CATALYST

(75) Inventors: Chii-Shu Chen, East Hanover, NJ (US); Peter A. Callais, Upper Providence, PA (US); J. Michael West, Hockessin, DE (US)

(73) Assignee: Atofina Chemicals, Inc., Philadelphia, PA (US)

( * ) Notice: Subject to any disclaimer, the term of this patent is extended or adjusted under 35 U.S.C. 154(b) by 0 days.

(21) Appl. No.: 09/976,939

(22) Filed: Oct. 12, 2001

(65) Prior Publication Data

US 2003/0073794 A1 Apr. 17, 2003

(51) Int. Cl.[7] .................................................. C08F 8/00
(52) U.S. Cl. ........................ 524/523; 524/524; 524/533; 525/193; 525/229; 525/305; 525/386; 526/230.5
(58) Field of Search ....................... 526/230.5; 525/193, 525/229, 325, 386; 524/523, 524, 533

(56) References Cited

U.S. PATENT DOCUMENTS

| 4,380,605 A | | 4/1983 | Gallagher et al. ............. 525/14 |
|---|---|---|---|
| 4,451,610 A | * | 5/1984 | Collister ....................... 525/19 |
| 4,535,110 A | * | 8/1985 | Iseler et al. .................. 524/196 |
| 4,622,354 A | * | 11/1986 | Iseler et al. .................. 523/527 |
| 4,634,753 A | * | 1/1987 | Sanchez ....................... 525/447 |
| 5,539,012 A | | 7/1996 | Klemarczyk et al. ......... 522/13 |
| 6,057,411 A | * | 5/2000 | Herold ......................... 526/227 |

FOREIGN PATENT DOCUMENTS

EP 1044994 10/2000

OTHER PUBLICATIONS

Organic Peroxides Product Bulletin by Atofina.

Organic Peroxides Product Bulletin by Atofina.

* cited by examiner

Primary Examiner—Bernard Lipman
(74) Attorney, Agent, or Firm—Williiam D. Mitchell

(57) ABSTRACT

Use of OO-t-amyl-O(2-ethylhexyl)monoperoxycarbonate as a curing catalyst for bulk molding compounds ("BMC"s) and sheet molding compounds ("SMC"s) is provided.

1 Claim, No Drawings

CURING CATALYST

BACKGROUND OF THE INVENTION

This invention relates to use of OO-t-amyl-O(2-ethylhexyl)monoperoxy-carbonate as a curing catalyst for bulk molding compounds ("BMC"s) and sheet molding compounds ("SMC"s). BMCs and SMCs find extensive use in the production of parts for autos, trucks, buses, other transportation, electrical and electronic applications. For cars and trucks, for example, several hundred million pounds of SMC annually go into the production of body panels and several million pounds of BMC annually go into the production of head lamp housing.

Organic peroxides having a ten hour half-life temperature of about 97–104° C., such as t-butyl perbenzoate with a ten hour half-life temperature of 104° C., have been used as the catalysts to cure these SMCs and BMCs. Patents describing these molding compounds and the processes for preparing same include U.S. Pat. Nos. 4,535,110 and 4,622,354 (for SMCs), and U.S. Pat. No. 4,451,610 (for BMCs), the specifications of which are incorporated herein by reference. The problem has been that the typical organic peroxide, if it has a fast cure time, also has a fast gel time, in which case the part cannot be properly molded at a fast molding cycle since the SMC or BMC does not have enough time to fill the mold at high temperature. Thus, what is desired is a peroxide with a high ratio of gel time to cure time so that the SMC or BMC will not gel up too quickly for the mold to be filled properly, yet cure quickly so that the parts can be produced quickly.

BRIEF SUMMARY OF THE INVENTION

Use of OO-t-amyl-O(2-ethylhexyl)monoperoxycarbonate as a curing catalyst for bulk molding compounds ("BMC"s) and sheet molding compounds ("SMC"s) is provided.

DETAILED DESCRIPTION

As illustrated in the examples below, it has now been found that OO-t-amyl-O(2-ethylhexyl)monoperoxycarbonate (ten hour half-life temperature of 99° C.) has a higher ratio of gel time to cure time for SMC or BMC if compared to other organic peroxides with a ten hour half-life temperature of about 97–104° C., resulting in the ability for the BMC and SMC industry to produce parts properly and quickly The OO-t-amyl-O(2-ethylhexyl)monoperoxycarbonate is used in an amount effective to cure and gel the BMC or SMC, generally from about 0.25 to about 4% by weight based on the combined weight of the resin and monomer.

The BMC and SMC compositions are well known, as are procedures for preparing the same, such as set forth in the three aforementioned patents. The resin is typically polyester or vinyl based, while examples of monomers are styrene and acrylic.

In the following examples BMCs were prepared in the same manner except for the organic peroxides, which were (with the ten hour half-life temperature in degrees Centigrade given in parenthesis) OO-t-amyl-O(2-ethylhexyl) monoperoxycarbonate (99) in Example 1, t-butyl perbenzoate (104) in Comparative Example 1, OO-t-butyl-O(2-ethylhexyl)monoperoxy-carbonate (100) in Comparative Example 2, OO-t-butyl-O-isopropylmonoperoxy-carbonate (99) in Comparative Example 3, t-amyl perbenzoate (100) in Comparative Example 4, t-butyl peroxyacetate (102) in Comparative Example 5 and t-butyl permethylbenzoate (97) in Comparative Example 6. The preparation procedure involved mixing 52 grams of unsaturated polyester resin, 32 grams of LP 40 (a low profile additive from Union Carbide which is 40% polyvinyl acetate in styrene), 16 grams of a 40% solid of polymethylmethacrylate bead in styrene), 2.3 grams of 5% parabenzoquinone in dimethyl phthalate, 2.6 grams of 38% magnesium oxide in saturated polyester, and 2.35 grams of the organic peroxide; then adding with mixing 220 grams of calcium carbonate powder, 3 grams of zinc stearate and 50 grams of Owens Corning 405 AA one-quarter inch chopped strands. The mixed compound was wrapped by SMC orange release film (1 mil), sealed in a bag prepared from SMC orange release film, put in a pyrex storage container with cap, and kept for 2 days in a refrigerator set at 31° F. The samples were then tested by a Micromet Dielectrometer as follows: The mini-press mold temperatures were preset at 300° F. for both the top and the bottom plates; the BMC samples were put in the cavity of the minipress mold; the delta frequency of the equipment was set at 10 hertz; each sample was tested from 0 to 180 seconds; and data were collected and analyzed with a Budd Analysis Software Module. Each BMC was measured five times. The gel time/cure time ratio results are shown in Table 1:

TABLE 1

| Gel Time/Cure Time Ratio | |
|---|---|
| Example 1 | 0.56 |
| Comparative Example 1 | 0.39 |
| Comparative Example 2 | 0.49 |
| Comparative Example 3 | 0.41 |
| Comparative Example 4 | 0.39 |
| Comparative Example 5 | 0.38 |
| Comparative Example 6 | 0.42 |

Increasing the amount of OO-t-amyl-O(2-ethylhexyl) monoperoxycarbonate from 2.35 grams to 3.21 grams still resulted in a ratio of 0.56. However, when the amounts of the other 6 peroxides were adjusted to have the same active oxygen content as 3.21 grams of OO-t-amyl-O(2-ethylhexyl)monoperoxycarbonate, the ratios of gel time/cure time ranged from only 0.32 to 0.44.

We claim:

1. A process for curing a solid, filled bulk or sheet molding composition which comprises adding to said composition OO-t-amyl-O(2-ethylhexyl)monoperoxycarbonate as a curing catalyst in an amount effective to cure and gel said composition.

* * * * *